United States Patent
Park et al.

(10) Patent No.: US 8,411,965 B2
(45) Date of Patent: Apr. 2, 2013

(54) IMAGE PROCESSING METHOD AND APPARATUS FOR DETECTING AN EDGE OF AN OBJECT WITHIN AN IMAGE

(75) Inventors: Hee-Chan Park, Seoul (KR); Sung-Dae Cho, Yongin-si (KR); Min-Kyu Park, Seoul (KR); Jin-Ho Kim, Seoul (KR); Ji-Hye Kim, Goyang-si (KR); Yun-Je Oh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 401 days.

(21) Appl. No.: 12/718,511

(22) Filed: Mar. 5, 2010

(65) Prior Publication Data
US 2010/0226579 A1 Sep. 9, 2010

(30) Foreign Application Priority Data
Mar. 5, 2009 (KR) .................... 10-2009-0018825

(51) Int. Cl.
*G06K 9/48* (2006.01)
(52) U.S. Cl. ........ 382/199; 382/260; 382/261; 382/266; 382/293; 382/298; 382/300; 348/441
(58) Field of Classification Search .................. 382/199, 382/260, 261, 266, 293, 298, 299, 300; 348/441
See application file for complete search history.

(56) References Cited

U.S. PATENT DOCUMENTS

| | | | |
|---|---|---|---|
| 2006/0020203 A1 | 1/2006 | Tamura | |
| 2007/0279494 A1* | 12/2007 | Aman et al. | 348/169 |
| 2008/0024658 A1 | 1/2008 | Wang et al. | |
| 2008/0309777 A1* | 12/2008 | Aoyama | 348/222.1 |

OTHER PUBLICATIONS

John Canny, "A Computational Approach to Edge Detection", IEEE Transactions on Pattern Analysis and Machine intelligence, Nov. 6, 1986.
Ziou et al., "Edge Detection Techniques—An Overview".

* cited by examiner

*Primary Examiner* — Mike Rahmjoo
(74) *Attorney, Agent, or Firm* — The Farrell Law Firm, P.C.

(57) ABSTRACT

An image processing method and apparatus capable of easily detecting an edge of an object from an input image, in which the edge is detected using one step, without a pre-processing step, and a complicated trigonometric function is not used for gradient detection. The image processing method includes setting a window within an input image, analyzing the window to determine directions of edges of objects within the image included in the window, detecting edge information including the edge directions, and processing and outputting the window using the edge information.

10 Claims, 4 Drawing Sheets
(1 of 4 Drawing Sheet(s) Filed in Color)

IMAGE PROCESSING METHOD AND APPARATUS FOR DETECTING AN EDGE OF AN OBJECT WITHIN AN IMAGE

PRIORITY

This application claims priority to an application filed in the Korean Industrial Property Office on Mar. 5, 2009 and assigned Serial No. 10-2009-0018825, the content of which is incorporated herein by reference.

BACKGROUND OF THE INVENTION

1. Field of the Invention

The present invention relates generally to an image processing method and apparatus capable of easily detecting an edge of an object within an input image, and more particularly to an image processing method and apparatus, wherein an edge of an object within an image is detected in one step, without a pre-processing step, which does not use a complicated trigonometric function when a gradient is detected.

2. Description of the Related Art

Detecting an edge of an object within an image is a basic technique of an algorithm for improving a quality of the image, and enables further processing of the image by sorting the image into an important structure, a texture detail, a smoothing region, etc.

Canny and Sobel edge detection methods are two conventional methods for detecting an edge of an object within an image. Canny or Sobel edge detection is frequently used for edge detection due to simple computation and easy hardware realization. However, for gradient detection, the Canny or Sobel edge detection method requires an arctan function, which creates difficulty in hardware realization. Additionally, the Canny edge detection, by nature, requires a pre-smoothing step. More specifically, when either the Canny or Sobel edge detection is applied to an image having noise without smoothing, many point artifacts or defects are generated from a uniformity region.

Accordingly, an edge detection method is needed that detects an edge in one step, without pre-processing, such as in a pre-smoothing step, and does not require a complicated trigonometric function, e.g., an arctan function, for gradient detection.

SUMMARY OF THE INVENTION

Accordingly, the present invention has been designed to solve at least the above-mentioned problems occurring in the prior art, and to provide an image processing method and apparatus capable of easily detecting an edge of an object within an input image, in which the edge is detected using one step, without a pre-processing step, and without using a complicated trigonometric function for gradient detection.

In accordance with an aspect of the present invention, there is provided an image processing method, which includes setting a window for an input image, analyzing the window to determine directions of edges of objects of the image within the window, detecting edge information including the edge directions, and processing and outputting the window using the edge information.

In accordance with another aspect of the present invention, there is provided an image processing apparatus, which includes a window setting unit for setting a window for an input image, an edge information detecting unit for analyzing the window to determine directions of edges of objects of the image within the window and for detecting edge information including the edge directions, and an image processing unit for processing and outputting the window using the edge information.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of the present invention will be more apparent from the following detailed description taken in conjunction with the accompanying drawings, in which.

DETAILED DESCRIPTION OF THE EMBODIMENT OF THE INVENTION

Figure 1:
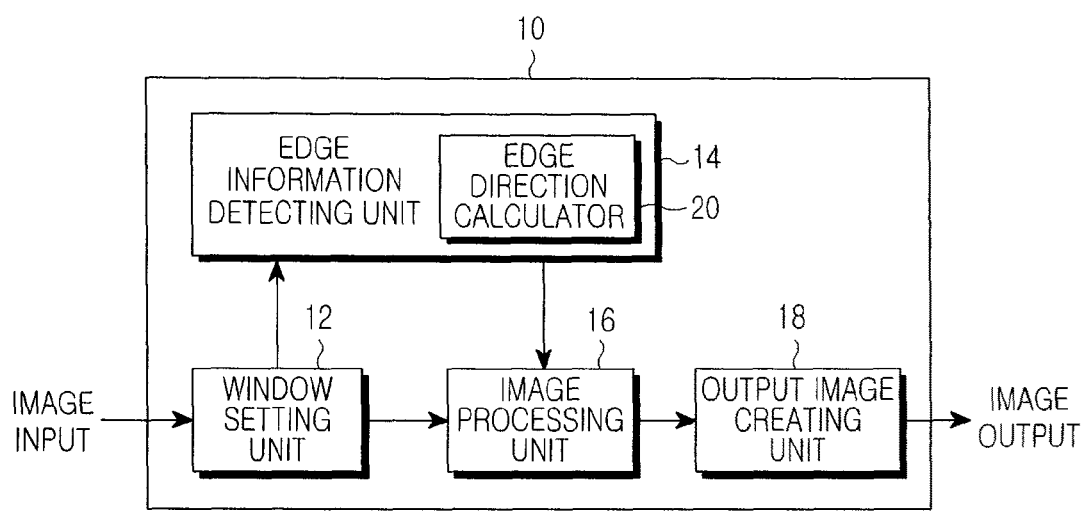
FIG. 1 is a block diagram schematically illustrating an image processing apparatus according to an embodiment of the present invention.

Hereinafter, certain embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it should be apparent to those skilled in the art that the present invention can be implemented without such specific definitions.

Further, in the following description of the present invention, detailed descriptions of known functions and configurations incorporated herein will be omitted when they may obscure the subject matter of the present invention.

FIG. 1 is a block diagram schematically illustrating an image processing apparatus according to an embodiment of the present invention.

Referring to FIG. 1, an image processing apparatus 10 includes a window setting unit 12, an edge information detecting unit 14, and an image processing unit 16. The image processing apparatus 10 further includes an output image creating unit 18. This image processing apparatus 10 may be applied to an image capturing device, such as a digital camera or a digital camcorder.

The window setting unit 12 sets a window including a portion of an image input to the image processing apparatus 10. The window may be set to include a central pixel which will be located at the center thereof, and to include certain number of pixels surrounding the central pixel. For example, the window set by the window setting unit 12 includes pixels ranging from 5×5 to any greater size of window (e.g. 12×12). The window setting unit 12 outputs the window to both of the edge information detecting unit 14 and the image processing unit 16.

The edge information detecting unit 14 detects edge information about an edge of an object included in the window set by the window setting unit 12. Here, the edge information detected by the edge information detecting unit 14 includes a maximum gradient, a Signal-to-Noise Ratio (SNR), standard deviation, etc. In accordance with an embodiment of the present invention, the edge information detecting unit 14 also detects a direction of the edge of the object included in the window. Accordingly, the edge information detecting unit 14 further includes an edge direction calculator 20, which will be described in more detail below with reference to FIG. 3.

The image processing unit 16 performs image processing on the window inputted from the window setting unit 12 using the edge information inputted from the edge information detecting unit 14.

The output image creating unit 18 receives the window from the image processing unit 16, converts the window so as to be suitable for display characteristics of a display (not shown), e.g., a frame size, image quality, resolution, or the like, included in the image processing apparatus 10, and then creates an output image.

Figure 2:
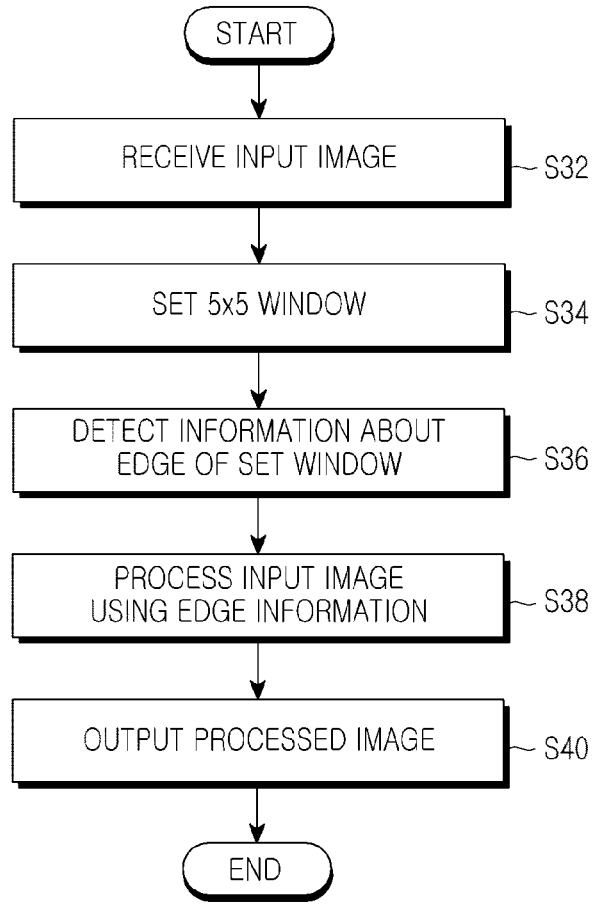
FIG. 2 is a flowchart illustrating an edge detecting method according to an embodiment of the present invention.

FIG. 2 is a flowchart illustrating an edge detecting method according to an embodiment of the present invention.

Referring to FIG. 2, the image processing apparatus 10 receives an input image in step S32. Thereafter, the window setting unit 12 sets a 5×5 window being a portion of the input image in step S34. Here, the window setting unit 12 may mask or extract the window from 5×5 pixels to any greater size of window (e.g. 12×12 or the total pixel size of the input image). A size of the masked window may be a value pre-stored in a memory (not shown) of the image processing apparatus 10. Further, the image processing apparatus 10 may previously determine a size of the masked window before the image is input. The window setting unit 12 masks the window in a sequence in which an original image is input, i.e. in a raster scan sequence.

After the window of the input image is set, the edge information detecting unit 14 analyzes pixels included in the window to detect information about edges of objects within the portion of the image included in the window in step S36. The edge information detected by the edge information detecting unit 14 includes directions of the edges, maximum gradients, SNRs, standard deviations, etc.

The edge information detecting unit 14 outputs the edge information to the image processing unit 16, and in step S38 the image processing unit 16 processes the input image (i.e. the window) using the edge information.

The image processing unit 16 reduces noise within the image by applying a weight based on a level of the calculated noise to the received window. Further, the image processing unit 16 sets weights based on brightness and chromaticity differences included in the edge information received from the edge information detecting unit 14, creates a brightness difference convolution mask and a chromaticity difference convolution mask using the set weights, and applies an edge enhancement convolution mask, a product of the brightness difference convolution mask and the chromaticity difference convolution mask, to the window, thereby performing edge enhancement.

When the image processing is completed, in step S40, the output image creating unit 18 receives the window processed in step S38, converts the window so as to be suitable for display characteristics of a display (not shown), and then outputs the converted window.

Figure 3:
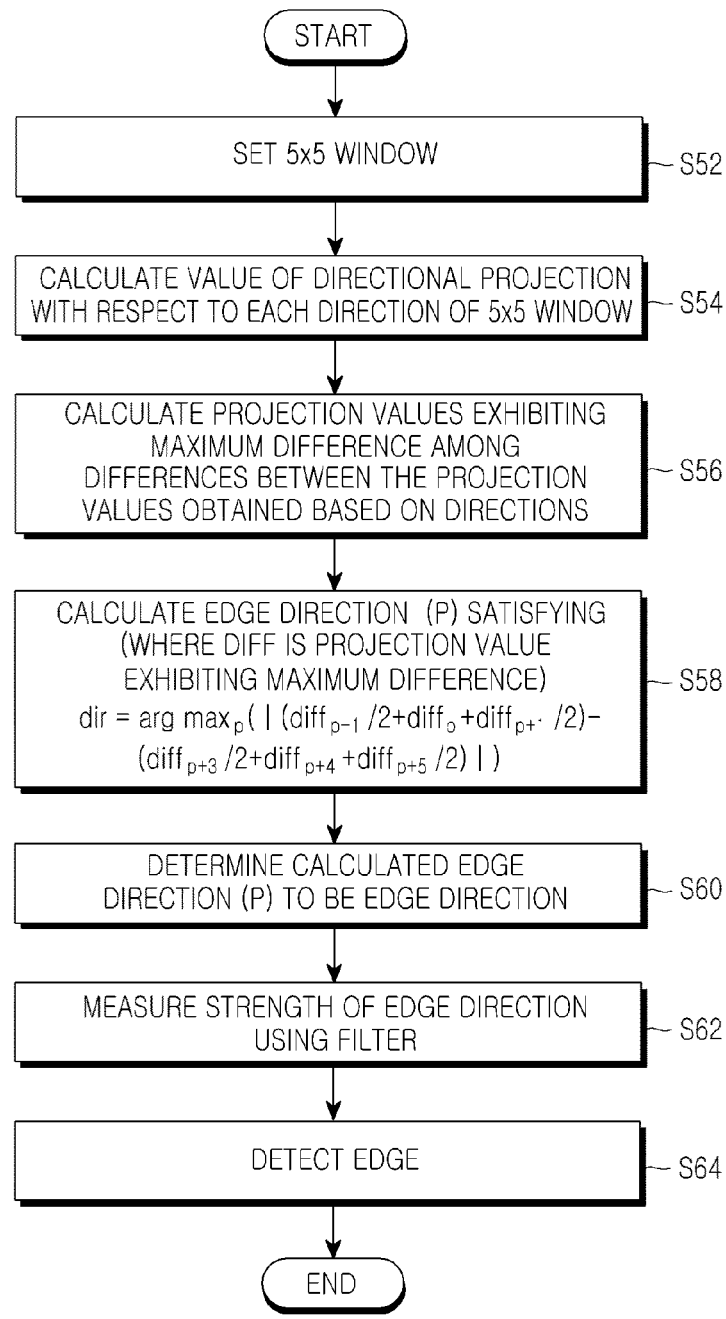
FIG. 3 is a flowchart illustrating a method of detecting an edge direction according to an embodiment of the present invention.

FIG. 3 is a flowchart illustrating a method of detecting an edge direction according to an embodiment of the present invention. In FIG. 3, it is assumed that the window setting unit 12 sets the window of an input image to a 5×5 pixel size, which hereinafter, is referred to as a "5×5 window."

Referring to FIG. 3, the image processing apparatus 10 receives an input image, and the window setting unit 12 sets the 5×5 window within the input image in step S52.

In step S54, the edge direction calculator 20 calculates a value of directional projection with respect to each direction of the 5×5 window. More specifically, when the image read as having the 5×5 pixel size is g(x, y), the edge direction calculator 20 divides 180 degrees by (2n−2) directions at equal intervals of an angle. In this example, because n=5, then 2n−2=8. Thus, the edge direction calculator 20 divides the 5×5 window by eight directions.

In accordance with an embodiment of the present invention, the edge direction calculator 20 calculates a projection value with respect to each direction of the window using Equation (1) below.

$$dir_{x,y,z} = \int_x \int_y \int_z g(x, y)\delta(\cos x + \sin y - z) \quad (1)$$

In Equation (1), x and y are the image coordinates of the 5×5 window, and z is the distance from the center point (2, 2) of the 5×5 window to x and y (i.e. the image coordinates {x, y}). Using Equation (1), the projection value with respect to each direction is obtained in Equation (2) as follows.

dir[0][0]=(g[0][0]+g[0][1]+g[0][2]+g[0][3]+g[0][4])*12;

dir[0][1]=(g[1][0]+g[1][1]+g[1][2]+g[1][3]+g[1][4])*12;

dir[0][2]=(g[2][0]+g[2][1]+g[2][2]+g[2][3]+g[2][4])*12;

dir[0][3]=(g[3][0]+g[3][1]+g[3][2]+g[3][3]+g[3][4])*12;

dir[0][4]=(g[4][0]+g[4][1]+g[4][2]+g[4][3]+g[4][4])*12;

dir[1][0]=(g[0][0]+g[1][2]+g[2][4])*20;

dir[1][1]=(g[1][1]+g[2][3])*30;

dir[1][2]=(g[1][0]+g[2][2]+g[3][4])*20;

dir[1][3]=(g[2][1]+g[3][3])*30;

dir[1][4]=(g[2][0]+g[3][2]+g[4][4])*20;

dir[2][0]=(g[0][2]+g[1][3]+g[2][4])*20;

dir[2][1]=(g[0][1]+g[1][2]+g[2][3]+g[3][4])*15;

dir[2][2]=(g[0][0]+g[1][1]+g[2][2]+g[3][3]+g[4][4])*12;

dir[2][3]=(g[1][0]+g[2][1]+g[3][2]+g[4][3])*15;

dir[2][4]=(g[2][0]+g[3][1]+g[4][2])*20;

dir[3][0]=(g[0][2]+g[2][3]+g[4][4])*20;

dir[3][1]=(g[1][2]+g[3][3])*30;

dir[3][2]=(g[0][1]+g[2][2]+g[4][3])*20;

dir[3][3]=(+g[1][1]+g[3][2])*30;

dir[3][4]=(g[0][0]+g[2][1]+g[4][2])*20;

dir[4][0]=(g[0][0]+g[1][0]+g[2][0]+g[3][0]+g[4][0])*12;

dir[4][1]=(g[0][1]+g[1][1]+g[2][1]+g[3][1]+g[4][1])*12;

dir[4][2]=(g[0][2]+g[1][2]+g[2][2]+g[3][2]+g[4][2])*12;

dir[4][3]=(g[0][3]+g[1][3]+g[2][3]+g[3][3]+g[4][3])*12;

dir[4][4]=(g[0][4]+g[1][4]+g[2][4]+g[3][4]+g[4][4])*12;

dir[5][0]=(g[0][4]+g[2][3]+g[4][2])*20;

dir[5][1]=(g[1][3]+g[3][2])*30;

dir[5][2]=(g[0][3]+g[2][2]+g[4][1])*20;

dir[5][3]=(g[1][2]+g[3][1])*30;

dir[5][4]=(g[0][2]+g[2][1]+g[4][0])*20;

dir[6][0]=(g[2][4]+g[3][3]+g[4][2])*20;

dir[6][1]=(g[1][4]+g[2][3]+g[3][2]+g[4][1])*15;

dir[6][2]=(g[0][4]+g[1][3]+g[2][2]+g[3][1]+g[4][0])*12;

dir[6][3]=(g[0][3]+g[1][2]+g[2][1]+g[3][0])*15;

dir[6][4]=(g[0][2]+g[1][1]+g[2][0])*20;

dir[7][0]=(g[2][4]+g[3][2]+g[4][0])*20;

dir[7][1]=(g[2][3]+g[3][1])*30;

dir[7][2]=(g[1][4]+g[2][2]+g[3][0])*20;

dir[7][3]=(g[1][3]+g[2][1])*30;

dir[7][4]=(g[0][4]+g[1][2]+g[2][0])*20     (2)

In Equation (2) above, 12, 15, 20 and 30 are values multiplied to calculate a common multiple required in the process of obtaining the value of the projection with respect to each direction. Equation (2) is an exemplary discrete version of a continuous function in Equation (1) and may be realized differently.

In step S56, the edge direction calculator 20 calculates the projection values exhibiting a maximum difference among differences between the projection values obtained with respect to the directions. This is expressed by Equation (3) below.

$$\text{diff}_i = \max(\text{dir}_{i,k} - \text{dir}_{i,l}) \quad (3)$$

In Equation (3), i is the x-axis coordinate on the 5×5 window, and k and l are the y-axis coordinates. The edge direction calculator 20, which calculates the projection values exhibiting the maximum difference among the differences between the projection values, detects the edge direction using the calculated projection values. The edge direction calculator 20 calculates the edge direction using Equation (4) below.

$$dir = \arg\max_p \left( \left| \left( \frac{\text{diff}_{p-1}}{2} + \text{diff}_p + \frac{\text{diff}_{p+1}}{2} \right) - \left( \frac{\text{diff}_{p+3}}{2} + \text{diff}_{p+4} \frac{\text{diff}_{p+5}}{2} \right) \right| \right) \quad (4)$$

In Equation (4), $\text{diff}_{p-1}$, $\text{diff}_{p+4}$, and $\text{diff}_{p+5}$ are the projection values exhibiting the maximum difference, and p indicates the edge direction. The edge direction calculator 20 calculates p satisfying Equation 4 in step S58. The edge direction calculator 20 determines p calculated using Equation 4 to be the edge direction in step S60.

The edge direction calculator 20 measures strength of the edge direction p using a filter in step S62, and detects an edge in S64.

In the process of measuring the strength of the edge direction p, one of the numerical expressions of Equation (5) below or equivalently a set of orthonormal cosine basis with 5 taps may be used.

dir strength=
$|p \otimes \{0.6152, 0.3485, 0, -0.3485, -0.6152\}|$ dir strength=$|p \otimes \{0.2265, 0, -0.4530, 0, 0.2265\}|$ dir strength=$|p \otimes \{0.4572, -0.5394, 0, 0.5394, 0.4572\}|$     (5)

In Equation (5), {0.6152, 0.3485, 0, −0.3485; −0.6152}, {0.2265, 0, −0.4530, 0, 0.2265}, and {0.4572, −0.5394, 0, 0.5394, −0.4572} are the values of respective filters that are used to measure the strength of the edge direction. It will be apparent to those skilled in the art that the coefficient and the size of these filter values may vary depending on design.

Although the present invention has been described above using a 5×5 window, detection of the edge direction and the measurement of the strength of the edge direction using Equations (1) through (5) is not limited to the 5×5 window. Thus, the process may be applied to all windows having, for example, 6×6, 7×7, 8×8, 9×9, 10×10, 11×11, and 12×12 pixel sizes, but is not limited to these shaped or sized windows.

Figure 4:
FIG. 4 illustrates an image from which edges are detected in accordance with an embodiment of the present invention.

FIG. 4 illustrates an image in which edges are detected in accordance with an embodiment of the present invention.

Referring to FIG. 4, the stronger a strength of an edge direction becomes, the brighter the color of the detected edge becomes. Further, the edges have different colors in FIG. 4 because the edge colors are varied depending on the edge direction. Thereby, the image processing apparatus 10 can emphasize edges within an image, and effectively remove noise from the image.

According to the above-described embodiments of the present invention, an image processing method and apparatus detects edges of objects within an image using one step, without a pre-processing step, and easily detect edges from the input image without using complicated trigonometric function for gradient detection.

When edges are detected according to the embodiments of the present invention, pre-processing the input image can be omitted, thereby reducing a time required to detect edges within the image. Further, a circuit design required to fulfill complicated calculations is also avoided because the complicated trigonometric function for gradient detection required for the pre-processing process of the conventional systems and methods is not used herein.

While the present invention has been shown and described with reference to certain embodiments thereof, it will be understood by those skilled in the art that various changes in form and details may be made therein without departing from the spirit and scope of the present invention as defined by the appended claims, and any equivalents thereof.

What is claimed is:

1. An image processing method in an image processing apparatus, the method comprising:
    setting, by the image processing apparatus, a window within an input image;
    analyzing the window to determine edges of objects within an image included in the window;
    calculating a value of directional projection of each direction of the window;
    calculating values of the directional projections exhibiting a maximum difference among differences between the values of the directional projections obtained based on the directions of the window;
    detecting directions of the edges using the values of the directional projections exhibiting the maximum difference;
    generating edge information including the edge directions; and
    processing and outputting the window using the edge information.

2. The image processing method of claim 1, wherein each value of a directional projection of each direction is calculated using:

$$dir_{x,y,z} = \int_x \int_y \int_z g(x, y)\delta(\cos x + \sin y - z)$$

where x and y are image coordinates of the window, and z is a distance from a center point of the window to x and y coordinates.

3. The image processing method of claim 1, wherein the values of the directional projections exhibiting the maximum difference among the differences between the values of the directional projections obtained based on the directions are calculated using:

$$diff_i = \max(dir_{i,k} - dir_{i,l})$$

where i is an x-axis coordinate of the window, and k and l are y-axis coordinates.

4. The image processing method of claim 3, wherein detecting the directions of the edges using the values of the directional projections exhibiting the maximum difference is performed using:

$$dir = \arg\max_p \left( \left| \left( \frac{diff_{p-1}}{2} + diff_p + \frac{diff_{p+1}}{2} \right) - \left( \frac{diff_{p+3}}{2} + diff_{p+4} \frac{diff_{p+5}}{2} \right) \right| \right)$$

where $diff_{p-1}$, $diff_{p+1}$, $diff_{p+4}$, and $diff_{p+5}$ are projection values exhibiting the maximum difference, and p indicates an edge direction.

5. The image processing method of claim 1, wherein the window is set to at least a 5×5 pixel size.

6. An image processing apparatus comprising:
    a window setting unit for setting a window within an input image;
    an edge information detecting unit for analyzing the window to determine edges of objects within an image included in the window, calculating a value of directional projection of each direction of the window, calculating values of the directional projections exhibiting a maximum difference among differences between the values of the directional projections obtained based on the directions of the window, detecting edge directions of the edges using the values of the directional projections exhibiting the maximum difference, and generating edge information including the edge directions; and
    an image processing unit for processing and outputting the window using the edge information.

7. The image processing apparatus of claim 6, wherein the edge information detecting unit calculates each value of a directional projection of each direction using:

$$dir_{x,y,z} = \int_x \int_y \int_z g(x, y)\delta(\cos x + \sin y - z)$$

where x and y are image coordinates of the window, and z is a distance from a center point of the window to x and y coordinates.

8. The image processing apparatus of claim 7, wherein the edge information detecting unit calculates the values of the directional projections exhibiting the maximum difference among the differences between the values of the directional projections obtained based on the directions of the window using:

$$diff_i = \max(dir_{i,k} - dir_{i,l})$$

where i is an x-axis coordinate of the window, and k and l are y-axis coordinates.

9. The image processing apparatus of claim 8, wherein the edge information detecting unit detects each edge direction using the values of the directional projections exhibiting the maximum difference using:

$$dir = \arg\max_p \left( \left| \left( \frac{diff_{p-1}}{2} + diff_p + \frac{diff_{p+1}}{2} \right) - \left( \frac{diff_{p+3}}{2} + diff_{p+4} \frac{diff_{p+5}}{2} \right) \right| \right)$$

where $diff_{p-1}$, $diff_{p+1}$, $diff_{p+4}$, and $diff_{p+5}$ are projection values exhibiting the maximum difference, and p indicates an edge direction.

10. The image processing apparatus of claim 6, wherein the window setting unit sets the window to at least a 5×5 pixel size.

* * * * *